Jan. 20, 1970  J. L. KEES  3,490,790
TRAILER HITCH

Filed May 22, 1968  3 Sheets-Sheet 1

Joe L. Kees
INVENTOR.

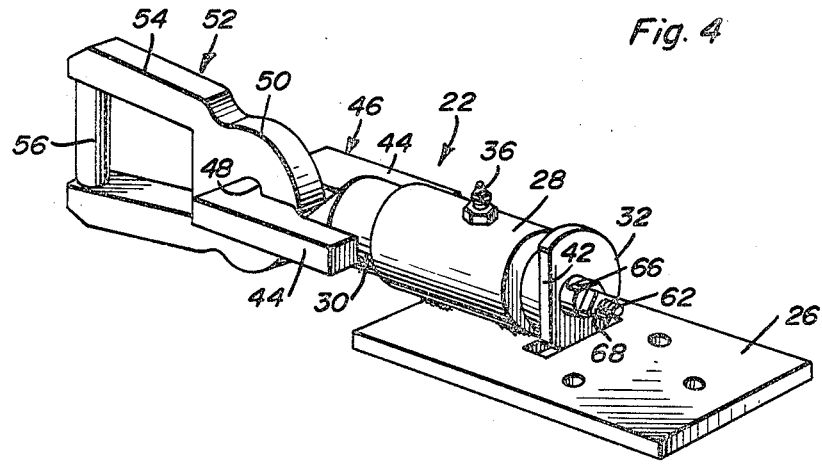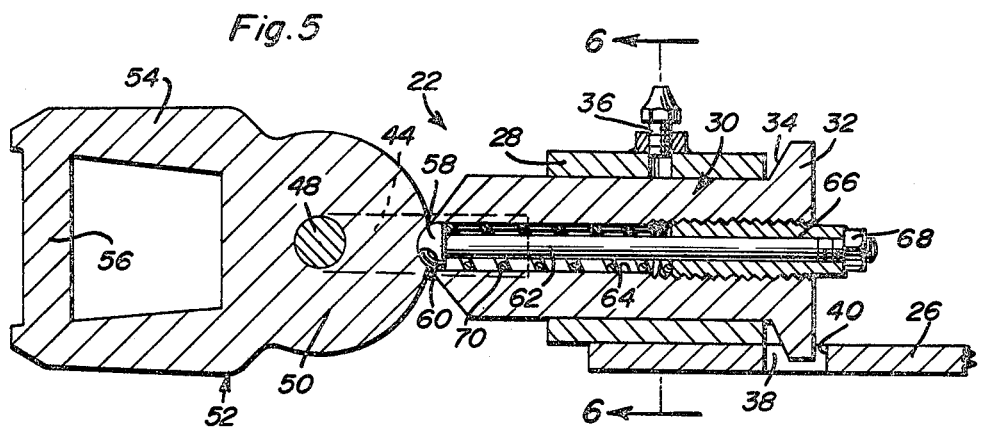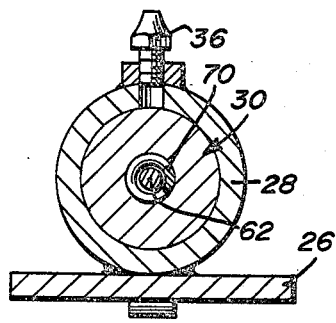

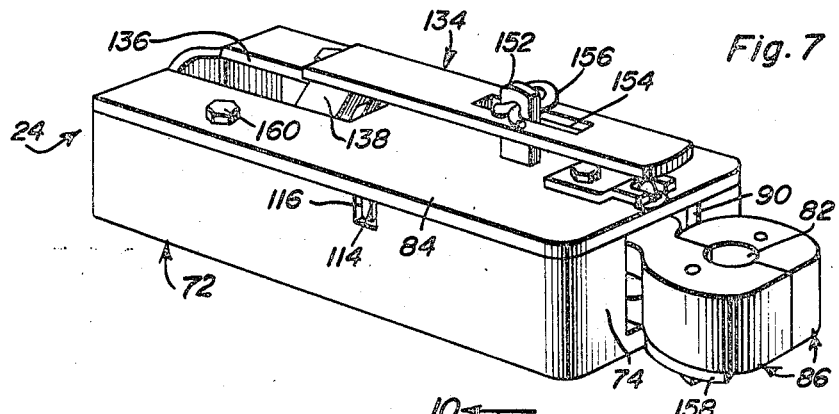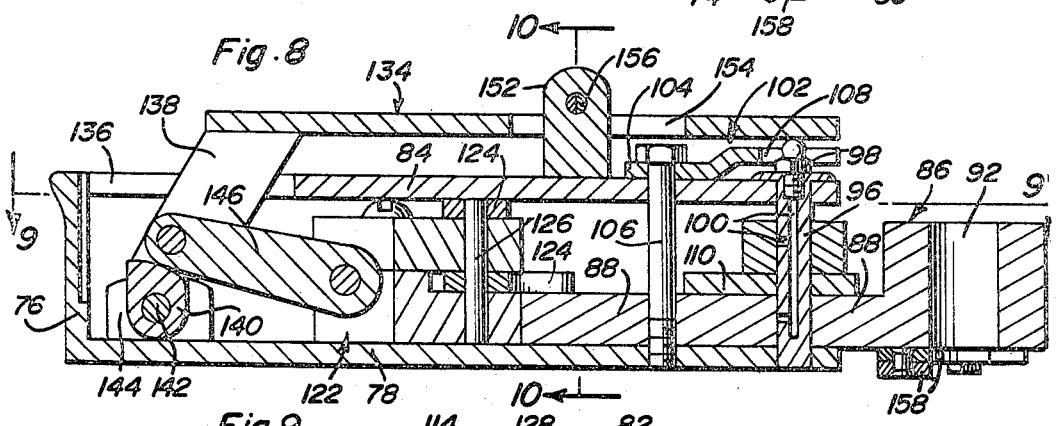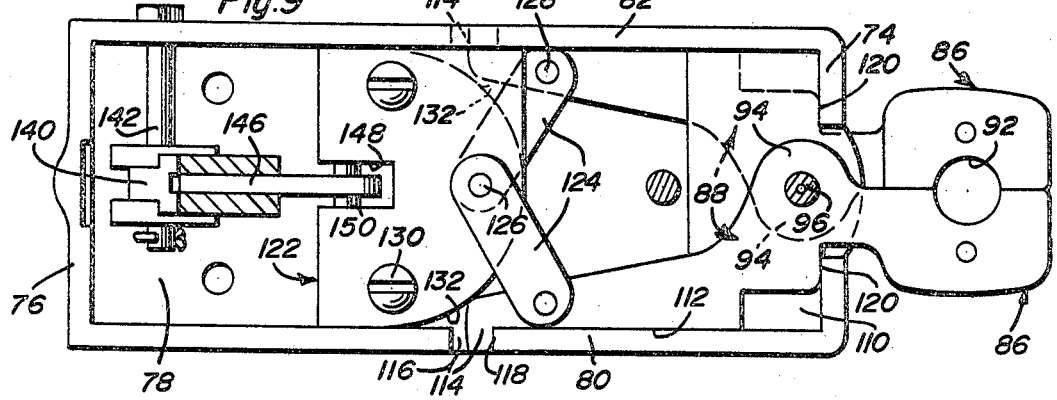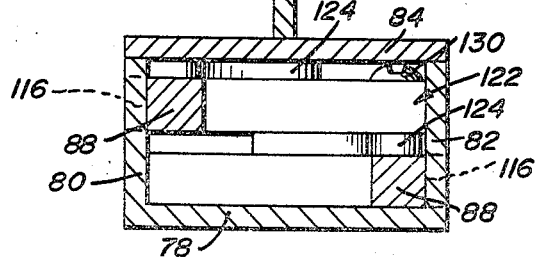

United States Patent Office 3,490,790
Patented Jan. 20, 1970

3,490,790
TRAILER HITCH
Joe L. Kees, Jonesboro, La., assignor of one-third each to Opal S. Kees and David T. Caldwell, both of Jonesboro, La.
Filed May 22, 1968, Ser. No. 731,195
Int. Cl. B60d 1/00, 1/08
U.S. Cl. 280—508                                    12 Claims

ABSTRACT OF THE DISCLOSURE

Releasably interconnectible hitch components for a towing vehicle and associated trailer. One of the components includes a universally mounted bar which is engaged by latch controlled jaws on the other component. The jaws are link interconnected for an initial automatic closing upon the forceful reception of the bar therebetween.

---

The instant invention relates to new and useful improvements in trailer hitches of the type wherein two hitch components are provided for releasable locking engagement with each other through the manipulation of a control lever or handle.

It is a primary object of the instant invention to provide a trailer hitch which is of a highly stable construction capable of providing a positive link between a towing vehicle and a trailing vehicle, while at the same time being constructed in a manner whereby the engagement and disengagement of the two components thereof can be effected in a simple, positive and rapid manner which does not detract from the highly stable nature of the locked components.

In conjunction with the above object, it is also a significant object of the instant invention to incorporate, within one of the hitch components, a universal mounting so as to accommodate elevational differences which will occur between the vehicles.

Also, it is a significant object of the instant invention to provide hitch components wherein an engagement of the components with each other will result in an automatic initial interlocking movement of the locking jaws.

Basically, the above objects are achieved through the provision of a first component wherein a hitching bar is adjustably mounted for reception within a pair of pivotally mounted jaws which include both projecting links for an automatic closing movement of the jaws about a received bar upon engagement of the bar with the links, and a jaw controlling handle which will be utilized to complete the closing of the jaws and locking of the jaws in their closed position about the bar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of a first one of the hitch components;

FIGURE 5 is an enlarged longitudinal cross-sectional view through the hitch component of FIGURE 4;

FIGURE 6 is a transverse cross-sectional view taken substantially on a plane passing along line 6—6 in FIGURE 5;

FIGURE 7 is a perspective view of the second hitch component;

FIGURE 8 is a longitudinal cross-sectional view taken through the hitch component of FIGURE 7;

FIGURE 9 is a horizontal cross-sectional view taken substantially on a plane passing along line 9—9 in FIGURE 8;

FIGURE 10 is a transverse cross-sectional view taken substantially on a plane passing along line 10—10 in FIGURE 8;

Figure 1:
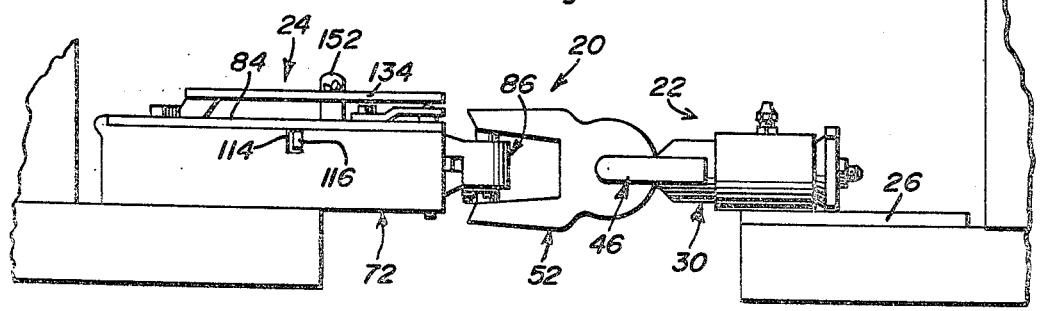
FIGURE 1 is a side elevational view of the two hitch components interlocked with each other.
Figure 2:
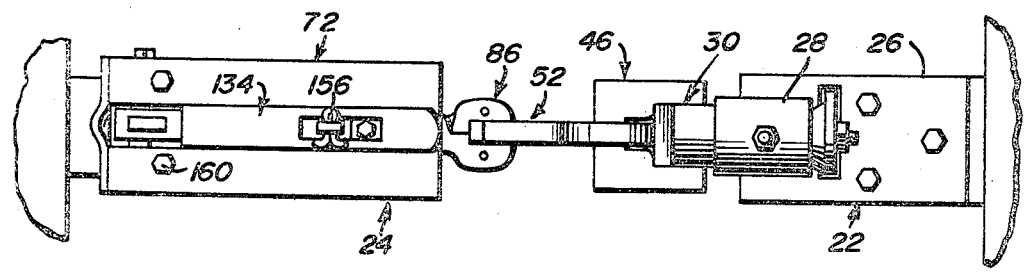
FIGURE 2 is a top plan view of the hitch and more particularly the two components thereof interlocked together.
Figure 3:
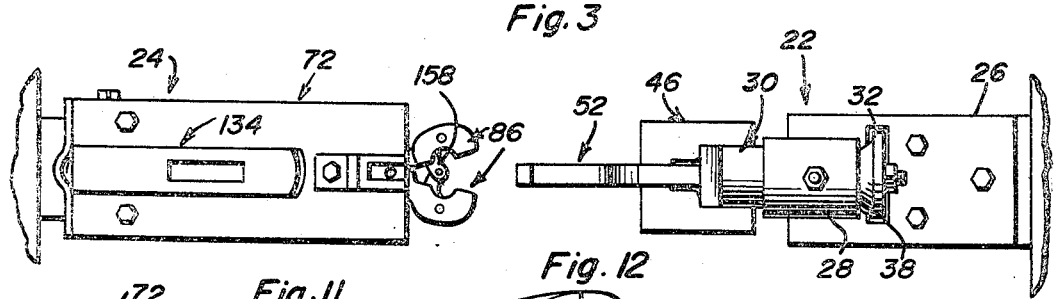
FIGURE 3 is a top plan view with the two hitch components released.

Referring now more specifically to the drawings, reference numeral 20 is used to generally designate the hitch comprising the instant invention. This hitch 20 consists basically of first and second hitch components 22 and 24, one mountable on the towing vehicle and one mountable on the towed or trailing vehicle. While it is preferred that the component 24 be mounted on the towing vehicle, the components 22 and 24 are actually interchangeable in the sense that either can be mounted on either vehicle for cooperation with the second component mounted on the other vehicle.

With reference to FIGURES 4, 5 and 6 in particular, it will be noted that the component 22 includes a flat base or mounting plate 26 having a cylindrical bearing sleeve 28 welded centrally thereto toward one end thereof. This sleeve 28 projects longitudinally beyond the one end of the plate 26 and rotatably receives an elongated shaft 30 which projects longitudinally beyond both ends of the sleeve 28. The inner end of the shaft 30, or that end overlying the mounting plate 26, includes an enlarged circular disk-like head 32 thereon which, through the slightly conical or tapered sleeve facing face 34 thereof, constitutes a limit to the withdrawal of the shaft 30 from the sleeve 28, the generally conical configuration of the face 34 providing for a minimum bearing engagement with the end of the sleeve 28 and thereby allowing for a relatively free rotation of the shaft 30 within the sleeve 28. As will be appreciated from the drawings, an appropriate Zerk grease fitting 36 can be mounted on the sleeve 28. The head 32 is of a size so as to require an enlarged or elongated opening 38 in the mounting plate 26 with the inner wall 40 of this opening 38 acting as a stop to the movement of the shaft 30 inwardly of the plate 26, thereby effectively retaining the shaft 30 for rotation within the sleeve 28. In order to provide for the replacement of the shaft 30 should such be necessary, the generally circular head 32 has a segment thereof removed so as to provide a reduced height flat portion 42 which, when aligned with the elongated opening 38, is positioned slightly above the upper surface of the mounting plate 26 whereby an inward withdrawl of the shaft 30 is possible. It will of course be appreciated that this flat portion 42 is so orientated as to, in the normal use of the hitch 20, never so align with the recess 38.

In the normal operative position of the shaft 30, the projecting outer or forward portion thereof has the opposed legs 44 of a horizontally orientated yoke 46 secured thereto. The yoke 46 also includes a cylindrical rod or bar 48 extending transversely between the outer ends of the yoke legs 44. Incidently, it will be appreciated that the welded connection between the yoke legs 44 and the forward end of the shaft 30 will have to be severed should replacement of the shaft 30 be required.

The cylindrical bar 48 of the yoke 46 is rotatably received through an enlarged head portion 50 on a vertically orientated yoke 52. The yoke 52 additionally includes a pair of vertically aligned legs 54 interconnected at their outer ends by a vertical cylindrical bar or rod 56 which is to constitute the specific element engaged by the second hitch component 24 as shall be explained subsequently.

From the structure thus far described, it will be appreciated that the yoke 52 pivots or rotates about the cylindrical bar 48 of the yoke 46 in a plane perpendicular to the yoke 46, while the yoke 46, and the yoke 52 therewith, rotates about a horizontal axis through the shaft 30, thereby providing what in effect amounts to a universal coupling. It will be noted that the outer ends of the legs 44 of the yoke 46 are laterally enlarged so as to approach the side of the rotatably mounted head 50 of the yoke 52 and thereby provide a degree of lateral stability so as to avoid a twisting or side shifting of the yoke 52.

In order to stabilize the yoke 52 in the position illustrated in FIGURES 4 and 5, such being desirable when interconnecting the components 22 and 24, a ball type detent 58 is provided for engagement with a mating recess 60 located at a central point on the periphery of the generally circular yoke head 50. The detent 58 actually constitutes an enlarged rounded head provided on an elongated bolt or rod-like member 62 which extends axially through an enlarged bore 64 provided through the rotatably mounted shaft 30. A threaded plug 66 is threadedly received within the internally threaded inner end portion of the bore 64 with this plug receiving the bolt 62 therethrough. The bolt 62 projects beyond the exposed end of the plug 66 and has a retaining nut 68 threaded thereon. Finally, an expanded coiled compression spring 70 is positioned within the bore 64 and engages between the detent forming head 58 and the inner end of the plug 66 so as to resiliently bias the detent 58 outwardly of the bore 64 for engagement with the peripheral surface of the head 50. It will be appreciated that through an adjustment of the plug 66, through the tool receiving outer end thereof, and the nut 68, a variation in the projection of the detent 58, as well as the holding force thereof, can be achieved. However, it should be appreciated that, while the engagement of the detent 58 within the mating recess or notch 60 is sufficient so as to retain the yoke 52 horizontal without any additional load thereon, this engagement will be such so as to be easily overcome whereby no interference will be encountered to the pivotal movement of the yoke 52 when the hitch components are interlocked and an actual towing operation is occurring.

With reference specifically to FIGURES 7 through 12, it will be noted that the second hitch component 24 has been detailed therein. This component 24 includes an elongated rectangular housing 72 having front and rear walls 74 and 76, a flat bottom or bottom wall 78, and opposed side walls 80 and 82, all rigidly interconnected or integrally formed into a single unit. Finally, a removable flat top or top wall 84 is also provided so as to enclose a substantial portion of the operating mechanism of the hitch component 24.

In order to lockingly engage with the normally vertically orientated bar 56 of the hitch component 22, the hitch component 24 includes a pair of enlarged generally arcuate opposed jaws 86 located forward of the front wall 74 and mounted on integral shanks 88 which project through an enlarged opening 90 defined in the front wall 74. Both jaws 86 include complementary inwardly directed recesses 92 which cooperate with each other, upon a closing of the jaws 86, so as to completely encompass and rotatably retain the cylindrical bar 56. The two shanks 88 are each of a height, throughout the length thereof, slightly less than one half the height of the jaws or jaw members 86 with each of the shanks 88, immediately inward of the jaws 86 or forward wall 74, including a laterally directed knuckle portion 94. These knuckle portions 94, inasmuch as one jaw shank 88 projects from the upper portion of the corresponding jaw 86 and the other shank 88 projects from the lower portion of its jaw 86, overlapping each other and receiving an elongated pivot pin 96 vertically therethrough. This pin 96 projects through both the bottom wall 78 and the top wall 84 and includes an upwardly projecting Zerk fitting 98 which, through internal passages 100, provides for an appropriate lubricating of the pivotal mounting of the shanks 88. The pin 96 is retained in position through an appropriate clip 102 having a first end portion 104 which is bolted to the housing 72 by means of an elongated bolt 106 extending through the clip portion 104, the top wall 84 and into threaded engagement with the bottom wall 78. The second end portion 108 of the clip 102 is upwardly offset and bifurcated so as to be received over the enlarged upper end of the pivot pin 96 and thereby effect a retention of this pin. Finally, in order to stabilize the shanks 88 at this point of pivotal mounting, a rigid transverse plate 110 is provided horizontally between the shanks and welded to the adjacent housing walls.

Each of the shanks 88, in the closed position of the jaws 86, includes a straight side edge 112 engaged against or positioned closely adjacent to the inner face of the adjoining side wall with the inner end of the shank terminating in a laterally outwardly directed lug 114. These lugs 114 extend through a pair of openings 116 provided in the opposed side walls 80 and 82 and bear against the forward surfaces 118 thereof so as to provide for a positive locking of the shanks to the housing for the transfer of the introduced load thereto. It will also be noted that each of the shanks 88 includes a laterally directed shoulder 120 adjacent the knuckle 94 which shoulder engages against the inner surface of the front wall 74 upon a closing of the jaws 86.

The pivotal movement of the jaws 86 between an open and closed position is effected by means of a longitudinally sliding block 122 engaged with the inner end portions of the shanks 88 through a pair of diverging links 124, each rotatably engaged with the block 122 by means of a common vertical pivot pin 126 and individually pivotally engaged with the two shanks 88 through separate pivot pins 128. It will be noted that the links 124 are vertically offset from each other so as to accommodate the vertically offset shanks 88, the upper link overlying the block 122 and the lower link being received within a recessed seat within the block 122 which, for purposes of convenience, may actually be formed of separate upper and lower sections secured by appropriate bolt means 130. With this construction, as the block 122 is drawn rearwardly within the housing 72, the rear ends of the shanks 88 will be pivoted toward each other about the pivot pin 96 which will result in an outward or opening pivoting of the jaws 86. It will be noted that the opposed edge portions 132 of the block 122 are appropriately relieved so as to enable a swinging movement of the shank ends thereby.

The movement of the block 122 is effected primarily through an elongated flat control handle 134 which overlies the top wall 84 and an enlarged opening 136 therein. The handle, in its locked position, parallels the top wall in spaced relation thereabove. This handle 134 includes a pair of laterally spaced depending legs 138 which extend through the top wall opening 136 and terminate in a common reduced diameter end portion 140 which is rotatably received about a shaft 142 supported between a pair of upstanding ears 144 on the bottom wall 78. With reference to FIGURE 9, it will be noted that the shaft 142 can actually constitute a bolt-like member extended into the housing through one side wall 82. An elongated control link 146 is pivotally mounted at one end between the handle legs 138, and at the other end within a rearwardly opening recess 148 on a transverse shaft or pin 150. Thus, as the handle 134 is swung upwardly and rearwardly, the block 122, through the link 146, will also slide rearwardly with this in turn producing an opening of the jaws 86. It will be appreciated that the top wall 84 actually acts so as to, in conjunction with the bottom wall 78, guide the block 122 for longitudinal movement within the housing 72.

As noted above, when the handle 134 is closed, it overlies and substantially parallels the top wall 84. In this position, an upstanding rigid projection or ear 152 extends through an elongated slot 154 defined in the handle and projects a sufficient distance thereabove so as to accommodate an appropriate cotter pin or the like 156 through a transverse hole therein with this pin 156 overlying the handle 134 and locking this handle down in its locked or closed position so as to preclude any possibility of an accidental release of the jaws 86.

Figures 11, 12:
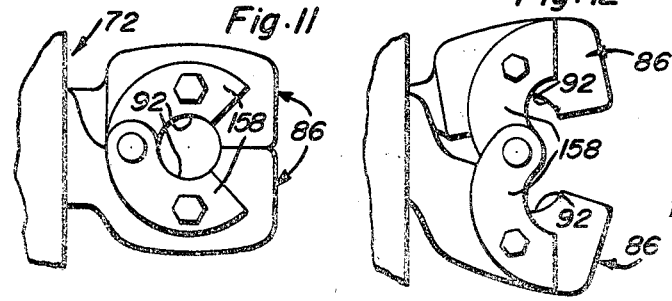
FIGURE 11 is an enlarged bottom plan view of the jaws in a closed position.
FIGURE 12 is a bottom plan view of the jaws in an open position.

Referring now specifically to the opened and closed bottom plan views of FIGURES 11 and 12, it will be noted that each jaw 86 has an arcuate link 158 pivotally secured thereto, these links in turn being pivotally engaged with each other in a manner whereby upon an opening of the jaws 86, as in FIGURE 12, the pivotally interconnected inner ends of the links 158 project forwardly into overlapping relation to the recessed portions 92. In this manner, upon the vertical bar 56 of the component 22 being forcibly introduced between the jaws 86, contact will be made with the pivotally interconnected inner ends of the links 158 which in turn will tend to pivotally force these inner ends rearward and produce a corresponding inward movement of the jaws 86 toward each other along with a movement of the handle 134 to its closed position. As such, even though a final locking will not in most instances be achieved, there will be an automatic initial interlocking of the components 22 and 24 which will facilitate the completion of the coupling through a downward forcing of the handle 134 and the introduction of the removable lockpin 156.

Finally, the rear portion of the top wall 84, to the opposite sides of the access slot 136 therein, is bolted to the underlying bottom wall by a pair of elongated threaded bolts 160. Incidentally, these bolts 160, as well as the bolt 106, can actually extend below the bottom wall 78 for a mounting of the component 24 on a subjacent portion of the vehicle involved. Likewise, the mounting plate 26 of the component 22 can also be provided with a plurality of bolt receiving apertures therethrough for a mounting of this plate 26 on the associated vehicle.

From the foregoing, it will be appreciated that a unique trailer hitch has been defined, this hitch including a pair of releasably interlockable hitch components, one of which includes a hitch bar and the second of which includes a pair of bar grasping jaws controlled through a vertically swinging handle. In addition, the jaws incorporate jaw controlling links whereby seating of the bar within the jaws will produce a partial locking of the jaws so as to facilitate the coupling of the components.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trailer hitch comprising first and second components, said first component including a coupling bar and means mounting said bar for pivotal movement, said second component including a pair of opposed jaws, means for selectively opening and closing said jaws about said bar for the selective locking of said components together, said jaws including configured inner faces which, upon a closing of the jaws, freely encircle the bar in a manner whereby rotation of the bar within the jaws is provided for, each of said jaws including a rearwardly directed shank, pivot means interconnecting said shanks rearward of said jaws whereby a selective movement of the ends of said shanks opposed from said jaws will produce a corresponding opening and closing movement of said jaws, means for selectively moving said shanks to open and close said jaws, said means for moving said shanks comprising a slidably mounted block adjacent the ends of said shanks opposite from said jaws, link means interconnecting said block and said shanks so as to effect a lateral movement of said shanks toward and away from each other in response to a longitudinal movement of said block, handle means connected to said block for effecting a longitudinal movement of said blocks, and a housing enclosing said block and said shanks, said housing including opposed side walls located laterally outward to each side of said shanks, the ends of said shanks adjacent said block including laterally outwardly directed lugs thereon, said side walls including lug receiving openings therein, said lugs being receivable within said openings upon an expansion of said shanks away from each other and a corresponding movement of the jaws toward each other.

2. The hitch of claim 1 wherein said housing includes a top wall and a bottom wall, said top and bottom walls cooperating with said side walls for guiding said block for longitudinal movement within said housing.

3. The hitch of claim 2 wherein said handle means projects through an opening defined in said top wall and is pivotally movable between a first position overlying and paralleling said top wall, such first position constituting a locked position, and a second position pivoted upwardly and outwardly from the first position, and means on said top wall selectively engageable with said handle means in the locked position thereof for a retention of said handle means in such position.

4. The hitch of claim 3 including a pair of links, one pivotally secured to each jaw, said jaw links being arcuate in configuration and pivotally engaged with each other centrally between said jaws, said jaw links being of a length whereby upon an opening of said jaws, the pivotally joined ends of these links move forwardly between the jaws in a position for engagement by an introduced coupling bar on the first hitch component, said jaw links, upon a closing of said jaws, generally conforming to the configuration of the inner ends of the bar receiving portions of the jaws.

5. The hitch of claim 4 wherein said first hitch component comprises a second bar in inwardly spaced relation to the first bar and orientated perpendicularly thereto, a yoke pivotally mounting said first bar on said second bar for movement about an axis defined by said second bar, a shaft perpendicular to said second bar and located in inwardly spaced relation thereto to the opposite side thereof from said first bar, means rotatably mounting said shaft for rotation about its own axis, and means fixing said second bar to said shaft for rotation therewith.

6. The hitch of claim 5 including spring-biased detent means engaged between said shaft and said yoke for releasably maintaining said yoke in a predetermined position relative to said shaft.

7. The hitch of claim 1 wherein said first hitch component comprises a second bar in inwardly spaced relation to the first bar and orientated perpendicularly thereto, a yoke pivotally mounting said first bar on said second bar for movement about an axis defined by said second bar, a shaft perpendicular to said second bar and located in inwardly spaced relation thereto to the opposite side thereof from said first bar, means rotatably mounting said shaft for rotation about its own axis, means fixing said second bar to said shaft for rotation therewith, and spring-biased detent means engaged between said shaft and said yoke for releasably maintaining said yoke in a predetermined position relative to said shaft.

8. A trailer hitch comprising first and second components, said first component including a coupling bar and means mounting said bar for pivotal movement, said second component including a pair of opposed jaws, means for selectively opening and closing said jaws about said bar for the selective locking of said components together, said jaws including configured inner faces which, upon a closing of the jaws, freely encircle the bar in a manner whereby rotation of the bar within the jaws is provided for, and a pair of links, one pivotally secured to each jaw, said jaw links being arcuate in configuration and pivotally engaged with each other centrally between said jaws, said jaw links being of a length whereby upon an opening of said jaws, the pivotally joined ends of these links move forwardly between the jaws in a position for engagement by an introduced coupling bar on the first hitch component, said jaw links, upon a closing of said jaws, generally conforming to the configuration of the inner ends of the bar receiving portions of the jaws.

9. The hitch of claim 8 wherein said first hitch component comprises a second bar in inwardly spaced relation to the first bar and orientated perpendicularly thereto, a yoke pivotally mounting said first bar on said second bar for movement about an axis defined by said second bar, a shaft perpendicular to said second bar and located in inwardly spaced relation thereto to the opposite side thereof from said first bar, means rotatably mounting said shaft for rotation about its own axis, means fixing said second bar to said shaft for rotation therewith, and spring-biased detent means engaged between said shaft and said yoke for releasably maintaining said yoke in a predetermined position relative to said shaft.

10. A trailer hitch comprising first and second components, said first component including a coupling member, said second component including a pair of opposed jaws, means for selectively opening and closing said jaws about said member for the selective locking of said components together, said jaws including inner faces which, upon a closing of the jaws, freely encircle the member in a manner whereby rotation of the member within the jaws is provided for, and a pair of links, one pivotally secured to each jaw, said jaw links being pivotally engaged with each other centrally between said jaws, said jaw links being of a length whereby upon an opening of said jaws, the pivotally joined ends of these links move forwardly between the jaws in a position for engagement by an introduced coupling member on the first hitch component, said jaw links, upon a closing of said jaws, generally conforming to said jaws whereby interference with the rotation of the introduced coupling member is avoided.

11. A trailer hitch comprising first and second components, said first component including a coupling member, said second component including a pair of opposed jaws, means for selectively opening and closing said jaws about said member for a selective locking of said components together, said jaws, upon a closing of the jaws, freely encircling the member in a manner whereby rotation of the member within the jaws is provided for, each of said jaws including a rearwardly directed shank, pivot means interconnecting said shanks rearward of said jaws whereby a selective movement of the ends of said shank opposed from said jaws will produce a corresponding opening and closing movement of said jaws, means for selectively moving said shanks to open and close said jaws, said second component including opposed wall means located laterally outward to each side of said shanks, the rearwardly directed ends of said shanks including laterally outwardly directed lugs thereon, said wall means including lug receiving portions, said lugs being received by said wall means portions upon an expansion of said shanks away from each other and a corresponding movement of the jaws toward each other in the manner whereby forward movement of the shanks is resisted.

12. The hitch of claim 11 including a pair of links, one pivotally secured to each jaw, said jaw links being pivotally engaged with each other centrally between said jaws, said jaw links being of a length whereby upon an opening of said jaws, the pivotally joined ends of these links move forwardly between the jaws in a position for engagement by an introduced coupling member on the first hitch component, said jaw links, upon a closing of the jaws, generally conforming to the jaws.

References Cited

UNITED STATES PATENTS

| | | | |
|---|---|---|---|
| 844,522 | 2/1907 | Johnson | 280—508 |
| 2,350,999 | 6/1944 | Beirise | 280—508 |
| 2,551,136 | 5/1951 | Keltner | 280—492 |
| 2,638,353 | 5/1953 | Danielson | 280—492 |
| 2,867,452 | 1/1959 | Ricklick | 280—492 |
| 3,272,523 | 9/1966 | Marker | 280—11.35 |

LEO FRIAGLIA, Primary Examiner

R. R. SONG, Assistant Examiner

U.S. Cl. X.R.

280—492